US010749277B2

(12) United States Patent
Lee et al.

(10) Patent No.: US 10,749,277 B2
(45) Date of Patent: Aug. 18, 2020

(54) INTERMEDIATE CONNECTION SYSTEM FOR ULTRA-HIGH-VOLTAGE DIRECT CURRENT POWER CABLE

(71) Applicant: LS CABLE & SYSTEM LTD., Anyang-si, Gyeonggi-do (KR)

(72) Inventors: Soo Bong Lee, Gyeongsangbuk-do (KR); Eui Hwan Jung, Chungcheongbuk-do (KR); Wook Jin Lee, Gumi-si (KR); Sung Pyo Hong, Seoul (KR); Seung Woo Cho, Seoul (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/614,671

(22) PCT Filed: Dec. 4, 2017

(86) PCT No.: PCT/KR2017/014070
§ 371 (c)(1),
(2) Date: Nov. 18, 2019

(87) PCT Pub. No.: WO2018/221804
PCT Pub. Date: Dec. 6, 2018

(65) Prior Publication Data
US 2020/0203855 A1 Jun. 25, 2020

(30) Foreign Application Priority Data

May 31, 2017 (KR) .................. 10-2017-0067567
Nov. 21, 2017 (KR) .................. 10-2017-0155740

(51) Int. Cl.
*H01R 4/12* (2006.01)
*H01B 3/44* (2006.01)
(Continued)

(52) U.S. Cl.
CPC ............... *H01R 4/12* (2013.01); *H01B 3/441* (2013.01); *H01B 9/006* (2013.01); *H01B 9/027* (2013.01)

(58) Field of Classification Search
CPC .......... H01R 4/12; H01B 3/441; H01B 9/006; H01B 9/027
See application file for complete search history.

(56) References Cited

U.S. PATENT DOCUMENTS

2002/0039654 A1* 4/2002 Gustafsson .............. C08K 5/01
428/375
2015/0075839 A1* 3/2015 Sun ........................ H01B 3/307
174/110 PM
(Continued)

FOREIGN PATENT DOCUMENTS

JP 2013026048 A 2/2013
KR 20120103497 A 9/2012
(Continued)

OTHER PUBLICATIONS

International Search Report for related International Application No. PCT/KR2017/014070; report dated Dec. 12, 2018; (3 pages).
(Continued)

*Primary Examiner* — Timothy J Thompson
*Assistant Examiner* — Amol H Patel
(74) *Attorney, Agent, or Firm* — K&L Gates LLP

(57) ABSTRACT

Provided is an intermediate connection system for an ultra-high-voltage direct-current (DC) power cable. Specifically, the present invention relates to an intermediate connection system, for an ultra-high-voltage DC power cable, which is capable of simultaneously preventing or minimizing electric field distortion, a decrease of DC dielectric strength, and a decrease of impulse breakdown strength due to the accumulation of space charges in an insulating layer of a cable (Continued)

and an insulating material of an intermediate connection part.

20 Claims, 2 Drawing Sheets

(51) Int. Cl.
    *H01B 9/02* (2006.01)
    *H01B 9/00* (2006.01)

(56) References Cited

U.S. PATENT DOCUMENTS

2015/0380128 A1* 12/2015 Josefsson ................ H01B 1/22
                                                                     174/120 SC
2018/0287354 A1* 10/2018 Ghorbani ............... H01B 3/441
2018/0309273 A1* 10/2018 Caimi .................... H02G 15/08

FOREIGN PATENT DOCUMENTS

| KR | 1020150016500 A1 | 2/2015 |
| KR | 20160084920 A | 7/2016 |
| KR | 20160088780 A | 7/2016 |

OTHER PUBLICATIONS

Written Opinion for related International Application No. PCT/KR2017/014070; report dated Dec. 12, 2018; (5 pages).

* cited by examiner

INTERMEDIATE CONNECTION SYSTEM FOR ULTRA-HIGH-VOLTAGE DIRECT CURRENT POWER CABLE

CROSS-REFERENCE TO RELATED APPLICATIONS

The present application is a National Stage of International Application No. PCT/KR2017/014070, filed Dec. 4, 2017 which claims priority to Korean Application No. 10-2017-0067567 filed May 31, 2017 and Korean Application No. 10-2017-0155740, filed Nov. 21, 2017, the disclosure of which are incorporated herein by reference.

FIELD OF THE INVENTION

The present invention relates to an intermediate connection system for an ultra-high-voltage direct-current (DC) power cable. Specifically, the present invention relates to an intermediate connection system, for an ultra-high-voltage DC power cable, which is capable of simultaneously preventing or minimizing electric field distortion, a decrease of DC dielectric strength, and a decrease of impulse breakdown strength due to the accumulation of space charges in an insulating layer of a cable and an insulating material of an intermediate connection part.

BACKGROUND OF THE INVENTION

In general, in a large power system requiring large-capacity and long-distance power transmission, high voltage transmission is necessary to increase a transmission voltage in terms of a reduction of power loss, a construction site problem, and an increase in power transmission capacity.

Power transmission methods may be largely classified into an alternating-current (AC) power transmission method and a direct-current (DC) power transmission method. The DC power transmission method refers to transmission of power by direct current. Specifically, in the DC power transmission method, first, a power transmission side converts AC power into an appropriate voltage, converts the voltage into direct current by a converter, and transmits the direct current to a power reception side via a transmission line, and the power reception side converts the direct current into AC power by an inverter.

In particular, the DC transmission method has been widely used because this method is advantageous in transmitting a large amount of power over a long distance and can be operated in connection with an asynchronous power system, and a loss rate of direct current is low and a stability thereof is high in long-distance transmission, compared to alternating current.

An insulator of a (ultra) high-voltage DC transmission cable used in the DC transmission method may be formed of insulating paper impregnated with an insulating oil or an insulating composition containing a polyolefin resin as a base resin. Recently, as cables are likely to be operated at relatively high temperatures, an insulator formed of an insulating composition containing a polyolefin resin that increases the amount of power transmission and is free from leakage of an insulating oil have come into widespread use.

However, the polyolefin resin has a linear molecular chain structure and thus is applied to an insulating layer of a cable by improving mechanical and thermal properties of the polyolefin resin by a crosslinking process. Thus, space charges are likely to be accumulated in the insulating layer of the cable due to crosslinking by-products inevitably generated due to decomposition of a crosslinking agent during the crosslinking process. The space charges may distort an electric field in the insulator of the (ultra) high-voltage DC transmission cable and thus dielectric breakdown may occur at a voltage lower than an initially designed breakdown voltage.

Such (ultra) high-voltage DC transmission cables are installed by connecting them to each other in units of tens to hundreds of meters via an intermediate connection part. Similarly, space charges may be accumulated in an insulating material of the intermediate connection part due to crosslinking by-products inevitably generated due to decomposition of a crosslinking agent during a crosslinking process. Accordingly, an electric field in the insulating material may distort and thus dielectric breakdown may occur at a voltage lower than an initially designed breakdown voltage of the intermediate connection part.

In the case of a cable used for a current-type DC transmission (LCC) that requires polarity inversion to change a direction of power transmission, an inorganic additive such as a magnesium oxide is uniformly dispersed in an insulating layer to solve the above problem. The inorganic additive is polarized in a DC electric field and thus space charges may be trapped, thereby minimizing electric field distortion caused by the accumulation of space charges. However, in the case of voltage-type DC transmission (VSC), polarity inversion is unnecessary, and an insulating composition to which an organic additive is added is used to optimize electrical stress to be applied to an insulator of the cable. Thus, it is necessary to accurately control the amount of space charges in the insulating layer.

Accordingly, there is an urgent need for an intermediate connection system, for an ultra-high-voltage DC power cable, which is capable of simultaneously preventing or minimizing electric field distortion, a decrease of DC dielectric strength, and a decrease of impulse breakdown strength due to the accumulation of space charges in an insulating layer of a cable or an insulating material of an intermediate connection part.

BRIEF SUMMARY OF THE INVENTION

The present invention is directed to providing an intermediate connection system, for an ultra-high-voltage direct-current (DC) power cable, which is capable of simultaneously preventing or minimizing electric field distortion, a decrease of DC dielectric strength and a decrease of impulse breakage strength due to the accumulation of space charges.

According to an aspect of the present invention, provided is an intermediate connection system for an ultra-high-voltage direct current (DC) power cable, comprising: a pair of DC power cables each including a conductor formed by twisting a plurality of strands, a cable inner semiconducting layer surrounding the conductor, a cable insulating layer, and a cable outer semiconducting layer, the pair of DC power cables provided such that ends thereof at which the conductors, the cable inner semiconducting layers, the cable insulating layers, and the cable outer semiconducting layers are sequentially exposed face each other; a conductor connection part configured to electrically and mechanically connecting the conductors exposed at the ends of the pair of DC power cables; and an intermediate connection part surrounding the connector connection part and the ends of the pair of DC power cables at which the conductors, the cable inner semiconducting layers, the cable insulating layers, and the cable outer semiconducting layers are sequentially exposed; wherein the intermediate connection part comprises: an intermediate-connection-part inner semiconducting layer surrounding the connector connection part; an intermediate-connection-part insulating layer surrounding the intermediate-connection-part inner semiconducting layer; an intermediate-connection-part outer semiconducting layer surrounding the intermediate-connection-part insulating layer; and an intermediate-connection-part protective sheath layer surrounding the intermediate-connection-part outer semiconducting layer, the intermediate-connection-part insulating layer is formed of an insulating composition containing a polyolefin resin and a crosslinking agent, and the intermediate-connection-part insulating layer is divided in a thickness direction thereof into three equal parts to obtain an inner layer, an intermediate layer and an outer layer, wherein a total amount of α-cumyl alcohol (α-CA), acetophenone (AP) and α-methyl styrene (α-MS) among crosslinking by-products contained in each of the inner layer, the intermediate layer, and the outer layer is 4,000 ppm or less.

According to another of the present invention, provided is the intermediate connection system for an ultra-high-voltage direct current (DC) power cable, wherein an average amount of the crosslinking by-products contained in each of the inner layer, the intermediate layer, and the outer layer is 3000 ppm or less.

According to other of the present invention, provided is the intermediate connection system for an ultra-high-voltage direct current (DC) power cable, wherein a breakdown voltage of the intermediate-connection-part insulating layer is 510 kV/mm or more.

According to other of the present invention, provided is the intermediate connection system for an ultra-high-voltage direct current (DC) power cable, wherein the polyolefin resin comprises a polyethylene resin.

According to other of the present invention, provided is the intermediate connection system for an ultra-high-voltage direct current (DC) power cable, wherein the crosslinking agent comprises a peroxide crosslinking agent.

According to other of the present invention, provided is the intermediate connection system for an ultra-high-voltage direct current (DC) power cable, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

According to other of the present invention, provided is the intermediate connection system for an ultra-high-voltage direct current (DC) power cable, wherein the insulating composition further comprises at least one additive selected from the group consisting of an antioxidant, an extrudability enhancer and a crosslinking aid.

According to other of the present invention, provided is the intermediate connection system for an ultra-high-voltage direct current (DC) power cable, wherein the intermediate-connection-part insulating layer is formed by cross-winding and crosslinking a non-crosslinked insulating tape containing the insulating composition.

According to other of the present invention, provided is the intermediate connection system for an ultra-high-voltage direct current (DC) power cable, wherein the conductor connection part is formed by welding ends of conductors of the pair of DC power cables together.

According to other of the present invention, provided is the intermediate connection system for an ultra-high-voltage direct current (DC) power cable, wherein a semiconductive composition of the intermediate-connection-part inner semiconducting layer or the intermediate-connection-part outer semiconducting layer comprises a crosslinking agent in an amount of 0.1 to 5 parts by weight, based on 100 parts by weight of a base resin of the semiconductive composition.

According to other of the present invention, provided is the intermediate connection system for an ultra-high-voltage direct current (DC) power cable, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (SPMA), ethylene butyl acrylate (EBA), and ethylene butyl methacrylate (EBMA).

According to other of the present invention, provided is the intermediate connection system for an ultra-high-voltage direct current (DC) power cable, wherein the cable insulating layer is formed of an insulating composition containing a polyolefin resin and a crosslinking agent, and when the cable insulating layer is divided in a thickness direction into three equal parts to obtain an inner layer, an intermediate layer and an outer layer, an average of amounts of α-cumyl alcohol (α-CA), acetophenone (AP) and α-methyl styrene (α-MS) which are three types of specific crosslinking by-products among the crosslinking by-products contained in each of the inner layer, the intermediate layer, and the outer layer is 3,890 ppm or less.

According to other of the present invention, provided is the intermediate connection system for an ultra-high-voltage direct current (DC) power cable, wherein a total amount of the three types of specific crosslinking by-products contained in the inner layer of the cable insulating layer is 3,990 ppm or less.

According to other of the present invention, provided is the intermediate connection system for an ultra-high-voltage direct current (DC) power cable, wherein a field enhancement factor (FEF) defined by the following Equation (1) is 140% or less:

$$FEF = (\text{maximally increased electric field in insulating sample/electric field applied to insulating sample}) * 100, \quad [\text{Equation 1}]$$

wherein the insulating sample is prepared by crosslinking the insulating composition of the cable insulating layer, the insulating sample having a thickness of 120 μm, the electric field applied to the insulating sample is a DC electric field of 50 kV/mm applied to electrodes connected to opposite sides of the insulating sample, and the maximally increased electric field in the insulating sample is a maximum value among increase values of the electric field during the application of the DC electric field of 50 kV/mm to the insulating sample for one hour.

According to other of the present invention, provided is the intermediate connection system for an ultra-high-voltage direct current (DC) power cable, wherein the polyolefin resin comprises a polyethylene resin.

According to other of the present invention, provided is the intermediate connection system for an ultra-high-voltage direct current (DC) power cable, wherein the crosslinking agent comprises a peroxide crosslinking agent.

According to other of the present invention, provided is the intermediate connection system for an ultra-high-voltage direct current (DC) power cable, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

According to other of the present invention, provided is the intermediate connection system for an ultra-high-voltage direct current (DC) power cable, wherein the insulating composition further comprises at least one additive selected from the group consisting of an antioxidant, an extrudability enhancer and a crosslinking aid.

According to other of the present invention, provided is the intermediate connection system for an ultra-high-voltage direct current (DC) power cable, wherein a semiconductive composition of the inner and outer semiconducting layers of the power cable comprises a crosslinking agent in an amount of 0.1 to 5 parts by weight, based on 100 parts by weight of a base resin of the semiconductive composition.

According to other of the present invention, provided is the intermediate connection system for an ultra-high-voltage direct current (DC) power cable, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (SPMA), ethylene butyl acrylate (EBA), and ethylene butyl methacrylate (EBMA).

In an intermediate connection system for an ultra-high-voltage direct current (DC) power cable according to the present invention, the amounts of specific crosslinking by-products generated during crosslinking can be accurately controlled by adjusting a degree of crosslinking by control of the amount of a crosslinking agent to be added to an insulating layer of a cable and an insulating material of an intermediate connection part and appropriate modification of a base resin, thereby simultaneously preventing or minimizing electric field distortion, a decrease of DC dielectric strength, and a decrease of impulse breakdown strength due to the accumulation of space charges in the insulating layer and the insulating material.

DETAILED DESCRIPTION OF THE INVENTION

Hereinafter, exemplary embodiments of the present invention will be described in detail. The present invention is, however, not limited thereto and may be embodied in many different forms. Rather, the embodiments set forth herein are provided so that this disclosure may be thorough and complete and fully convey the scope of the invention to those skilled in the art. Throughout the specification, the same reference numbers represent the same elements.

Figure 1:
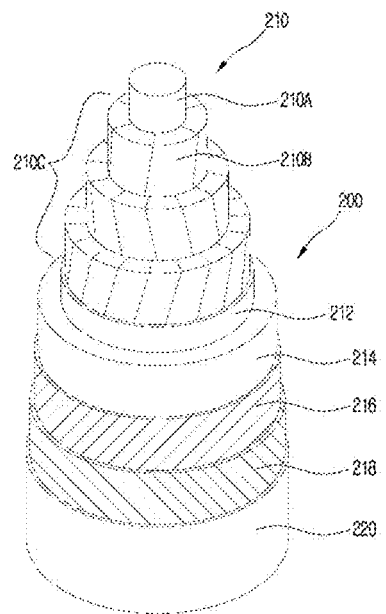
FIG. 1 is a schematic cross-sectional view of an ultra-high-voltage direct-current (DC) power cable applied to an intermediate connection system for an ultra-high-voltage DC power cable, according to the present invention.

FIG. 1 is a schematic cross-sectional view of an ultra-high-voltage direct-current (DC) power cable applied to an intermediate connection system for an ultra-high-voltage DC power cable, according to the present invention.

Referring to FIG. 1, a power cable 200 includes a cable core part including a conductor 210 formed by twisting a plurality of strands, an inner semiconducting layer 212 surrounding the conductor, an insulating layer 214 surrounding the inner semiconducting layer 212, and an outer semiconducting layer 216 surrounding the insulating layer 214, the cable core part being configured to transmit power along the conductor 210 only in a lengthwise direction of the cable and prevent leakage of current in a radial direction of the cable.

The conductor 21 acts as a path through which current flows to transmit power, and may be formed of a material, e.g., copper or aluminum, having high conductivity to minimize power loss and having strength and flexibility appropriate to manufacture and use a cable. The conductor 210 may be either a circularly compressed conductor manufactured by twisting a plurality of round strands and compressing the twisted round strands into a round shape or a flat conductor having a round cross-section and including a flat strand layer 210C consisting of a round center strand 210A and flat strands 210B twisted to surround the round center strand 210A. The flat conductor has a higher space factor than that of the circularly compressed conductor and thus an outer diameter of a cable may decrease when the flat conductor is used.

However, because the conductor 210 is formed by twisting a plurality of strands, a surface thereof is not smooth and thus an electric field may not be uniform and a corona discharge is likely to occur therein locally. In addition, when a gap occurs between the surface of the conductor 210 and the insulating layer 214 described later, insulation performance may decrease. In order to solve the above problems, the inner semiconducting layer 212 is formed outside the conductor 210.

The inner semiconducting layer 212 is formed by adding conductive particles, such as carbon black, carbon nanotubes, carbon nanoplates or graphite, to an insulating material and thus has semiconductivity, and prevents a sudden electric field change between the conductor 210 and the insulating layer 214 described later, thereby stabilizing insulation performance. In addition, the inner semiconducting layer 212(add OK?) suppresses an uneven charge distribution on a surface of the conductor 210 to achieve a uniform electric field and prevents the occurrence of a gap between the conductor 210 and the insulating layer 214 to suppress a corona discharge, dielectric breakdown, etc.

The insulating layer 214 is provided outside the inner semiconducting layer 212 to electrically insulate the inner semiconducting layer 212(OK?) from the outside, thereby preventing current flowing through the conductor 210 from leaking to the outside. In general, a breakdown voltage of the insulating layer 214 should be high and insulation performance thereof should be stably maintained for a long time. Furthermore, the insulating layer 214 should have low dielectric loss and have heat resistance performance. Accordingly, the insulating layer 214 may be formed of a polyolefin resin such as polyethylene and polypropylene, and preferably, a polyethylene resin. Here, the polyethylene resin may be a crosslinked resin.

The outer semiconducting layer 216 is provided outside the insulating layer 214. Similar to the inner semiconducting layer 12, the outer semiconducting layer 216 is formed of a material having semiconductivity by adding conductive particles, such as carbon black, carbon nanotubes, carbon nanoplates, or graphite, to an insulating material, and suppresses a non-uniform charge distribution between the insulating layer 214 and a metal sheath 218 described later, thereby stabilizing insulation performance. In addition, the outer semiconducting layer 216 planarizes a surface of the insulating layer 214 of the cable to mitigate electric field concentration so as to prevent a corona discharge, and physically protects the insulating layer 214.

The core part of the cable, and particularly, the inner semiconducting layer 212, the insulating layer 214, and the outer semiconducting layer 216 are parts in which electric field distortion is most likely to occur due to generation, accumulation or injection of space charges and dielectric breakdown is most likely to result from the electric field distortion, as will be described in detail later.

The core part may further include a moisture absorbing layer to prevent moisture from penetrating the cable. The moisture absorbing layer may be formed between the twisted strands and/or outside the conductor 210, and be in the form of powder, tape, a coating layer or a film containing a super absorbent polymer (SAP) capable of quickly absorbing moisture penetrating the cable and having excellent capability of maintaining a state of absorbing the moisture to prevent penetration of moisture in the lengthwise direction of the cable. In addition, the moisture absorbing layer may have semiconductivity to prevent a sudden electric field change.

A protective sheath part is provided outside the core part. A power cable installed in an environment exposed to water, such as the seabed, further includes an outer cover part. The protective sheath part and the outer cover part protect the core part of the cable from various environmental factors, such as moisture penetration, mechanical trauma, and corrosion, which may affect power transmission performance of the cable.

The protective sheath part includes a metal sheath layer 218 and an inner sheath 220 to protect the core part of the cable from fault current, external forces or other external environmental factors.

The metal sheath layer 218 may be grounded at an end of the power cable to serve as a path through which fault current flows when an accident such as a ground fault or a short circuit occurs, protect the cable from external shocks, and prevent an electric field from being discharged to the outside of the cable. In addition, in the case of a cable installed in an environment such as the sea bottom, the metal sheath layer 218 may be formed to seal the core part to prevent degradation of insulation performance due to invasion of foreign substances such as moisture. For example, the metal sheath layer 218 may be formed to have seamless outer surfaces by extruding a molten metal outside the core part to enhance watertightness performance. The metal may be lead or aluminum, preferably, lead having excellent corrosion resistance to seawater, particularly in the case of a submarine cable, and more preferably, a lead alloy containing a metal element to supplement mechanical properties.

Furthermore, an anti-corrosion compound, e.g., blown asphalt, may be applied onto a surface of the metal sheath layer 218 to further improve corrosion resistance, watertightness, etc. of the cable and improve adhesion to the inner sheath 220. A nonwoven copper wire tape (not shown) and a moisture absorbing layer may be additionally provided between the metal sheath layer 218 and the core part. The nonwoven copper wire tape includes copper wire, a nonwoven tape, and the like to facilitate electrical contact between the outer semiconducting layer 216 and the metal sheath layer 218. The moisture absorbing layer is in the form of powder, a tape, a coating layer or a film containing a super absorbent polymer (SAP) capable of quickly absorbing moisture penetrating into the cable and maintaining a state of absorbing the moisture to prevent penetration of moisture in a lengthwise direction of the cable. In addition, copper wire may be included in the water absorbing layer to prevent a sudden electric field change in the water absorbing layer.

The inner sheath 220 formed of a resin such as polyvinyl chloride (PVC) or polyethylene is provided outside the metal sheath layer 218 to improve corrosion resistance, watertightness, etc. of the cable and protect the cable from mechanical trauma and other external environmental factors such as heat and ultraviolet rays. In particular, a polyethylene resin having excellent watertightness is preferably used in the case of a power cable laid on the sea bottom, and a polyvinyl chloride resin is preferably used in an environment requiring flame retardancy.

The protective sheath part may further include a metal reinforcement layer formed of a semiconducting non-woven fabric tape or the like and buffers an external force applied to the power cable and an outer sheath formed of a resin such as polyvinyl chloride or polyethylene so as to further improve the corrosion resistance, watertightness, etc. of the power cable and protect the power cable from mechanical trauma and other external environmental factors such as heat and ultraviolet rays.

A power cable laid on the sea bottom is easily damaged by the anchor of a ship, a bending force caused by sea currents or waves, friction with the sea bottom, and the like and thus the outer cover part may be provided outside the protective sheath part to prevent damage to the power cable. The outer cover part may include an armor layer and a serving layer. The armor layer may be formed of steel, galvanized steel, copper, brass, bronze, or the like, and may be formed in at least one layer by cross-winding wire having a circular or flat cross section. The armor layer enhances mechanical properties and performance of the cable and additionally protects the cable from external forces. The serving layer formed of polypropylene yarn or the like is formed in one or more layers on and/or under the armor layer to protect the cable. The serving layer which is an outermost layer may be formed of two or more materials of different colors to secure visibility of the cable laid on the sea bottom.

The inner semiconducting layer 212 and the outer semiconducting layer 216 are formed by extrusion of a semiconducting composition in which conductive particles such as carbon black, carbon nanotubes, carbon nanoplates or graphite are dispersed in a base resin and a crosslinking agent, an antioxidant, a scorch inhibitor, and the like are additionally added.

Here, the base resin is preferably formed of an olefin resin similar to the base resin of the insulating composition of the insulating layer 214 for interlayer adhesion between the semiconducting layers 212 and 216 and the insulating layer 14. More preferably, the base resin is formed of olefin and a polar monomer, e.g., ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), ethylene butyl methacrylate (EBMA) or the like, in consideration of compatibility with the conductive particles.

In addition, the crosslinking agent may be a silane crosslinking agent or an organic peroxide crosslinking agent, such as dicumyl peroxide, benzoyl peroxide, lauryl peroxide, t-butyl cumyl peroxide, di(t-butyl peroxy isopropyl) benzene, 2,5-dimethyl-2,5-di (t-butyl peroxy) hexane, or di-t-butyl peroxide, according to the method of crosslinking the base resin contained in the semiconducting layers 212 and 216.

The semiconductive composition of the inner and outer semiconducting layers 212 and 216 may include 45 to 70 parts by weight of conductive particles, such as carbon black, based on 100 parts by weight of the base resin. When the amount of the conductive particles is less than 45 parts by weight, sufficient semiconducting properties may not be realized, whereas when the amount of the conductive particles is greater than 70 parts by weight, the extrudability of the inner and outer semiconducting layers 212 and 216 may decrease and thus surface properties or productivity of the cable may be lowered.

In the semiconductive composition of the inner and outer semiconducting layers 212 and 216, the amount of the crosslinking agent may be accurately controlled to be 0.1 to 5 parts by weight, and preferably, 0.1 to 1.5 parts by weight, based on 100 parts by weight of the base resin.

Here, when the amount of the crosslinking agent is greater than 5 parts by weight, the amount of crosslinking by-products inevitably generated during crosslinking of the base resin contained in the semiconducting composition may be excessive, and the crosslinking by-products may move into the insulating layer 214 via the interface between the semiconducting layers 212 and 216 the insulating layer 214 and thus distortion of an electric field may be accelerated due to the accumulation of heterocharges, thereby reducing a breakdown voltage of the insulating layer 214. In contrast, when the amount of the crosslinking agent is less than 0.1 parts by weight, a degree of crosslinking is insufficient and thus mechanical properties, heat resistance, etc. of the semiconducting layers 212 and 216 may be insufficient.

The insulating layer 214 may be formed of, for example, a polyolefin resin such as polyethylene or polypropylene as a base resin, and may be preferably formed by extrusion of an insulating composition containing a polyethylene resin.

The polyethylene resin may include ultra-low-density polyethylene (ULDPE), low-density polyethylene (LDPE), linear low-density polyethylene (LLDPE), medium-density polyethylene (MDPE), high-density polyethylene (HDPE), or a combination thereof. Alternatively, the polyethylene resin may include a homopolymer, a random or block copolymer of α-olefin, such as ethylene, propylene, 1-butene, 1-pentene, 1-hexene, or 1-octene, or a combination thereof.

In addition, the insulating composition of the insulating layer 214 may include a crosslinking agent and thus the insulating layer 214 may be formed of crosslinked polyolefin (XLPO), and preferably, crosslinked polyethylene (XLPE) by a separate crosslinking process during or after extrusion. Alternatively, the insulating composition may further include other additives such as an antioxidant, an extrusion enhancer, and a crosslinking aid.

The crosslinking agent contained in the insulating composition may be the same as that contained in the semiconducting composition, and may be, for example, a silane crosslinking agent or an organic peroxide crosslinking agent, such as dicumyl peroxide, benzoyl peroxide, lauryl peroxide, t-butyl cumyl peroxide, di(t-butyl peroxy isopropyl) benzene, 2,5-dimethyl-2,5-di (t-butyl peroxy) hexane, or di-t-butyl peroxide. Here, the crosslinking agent may be contained in the insulating composition in an amount of less than 1 wt %, for example, an amount of 0.1 wt % or more and less than 1 wt %, based on the total weight of the insulating composition.

The present inventors have completed the present invention through experimental confirmation that specific crosslinking by-products causing generation of space charges among crosslinking by-products inevitably generated during crosslinking of the insulating layer 214 were α-cumyl alcohol (α-CA), acetophenone (AP), and α-methyl styrene (α-MS), the amounts of the specific crosslinking by-products were limited (particularly, according to a position on the insulating layer 214 in a thickness direction of the insulating layer 214) by limiting the amount of the crosslinking agent contained in the insulating composition of the insulating layer 214 to be less than 1 wt % and performing degasing after the crosslinking of the insulating layer, and generation of space charges and electric field distortion were significantly reduced due to the limitation of the amount of the specific crosslinking by-products, thereby simultaneously preventing or minimizing a decrease of DC dielectric strength and impulse breakdown strength of the insulating layer 214.

Furthermore, the present inventors have completed the present invention through experimental confirmation that a problem that a degree of crosslinking of the insulating layer 214 may be lowered due to the limitation of the amount of the crosslinking agent to be less than 1 wt % and thus the mechanical and thermal properties of the insulating layer 214 may be lowered can be fixed by achieving a crosslinking degree of 60% or more, e.g., 60 to 70%, by increasing vinyl group content of the base resin contained in the insulating composition of the insulating layer 214.

In detail, when the insulating layer 214 was divided in a thickness direction thereof into three parts, i.e., an inner layer which is a lower layer located directly on the conductor 210, an intermediate layer on the inner layer, and an outer layer on the intermediate layer, an average of total amounts of the three types of specific crosslinking by-products of these layers was adjusted to 3,890 ppm or less to suppress generation of space charges in the insulating layer 214. Thus, a field enhancement factor (FEF) of Equation 1 below indicating a degree of electric field distortion in the insulating layer 214 was adjusted to about 140% or less, thereby simultaneously preventing or minimizing a decrease of DC dielectric strength and impulse breakdown strength of the insulating layer 214.

FEF=(maximally increased electric field in insulating sample/electric field applied to insulating sample)*100     [Equation 1]

In Equation 1 above, the insulating sample is prepared by crosslinking the insulating composition of the insulating layer 214, the insulating sample having a thickness of 120 μm, the electric field applied to the insulating sample is a DC electric field of 50 kV/mm applied to electrodes connected to opposite sides of the insulating sample, and the maximally increased electric field in the insulating sample is a maximum value among increase values of the electric field during the application of the DC electric field of 50 kV/mm to the insulating sample for one hour.

Furthermore, the inner layer of the insulating layer 214 is located directly on the conductor 210 to form a heterogeneous interface with the inner semiconducting layer 212 and thus dielectric breakdown is likely to occur therein because a relatively high electric field is applied thereto. Thus, the total amount of the three types of specific crosslinking by-products in the inner layer is more preferably adjusted to 3,990 ppm or less.

Figure 2:
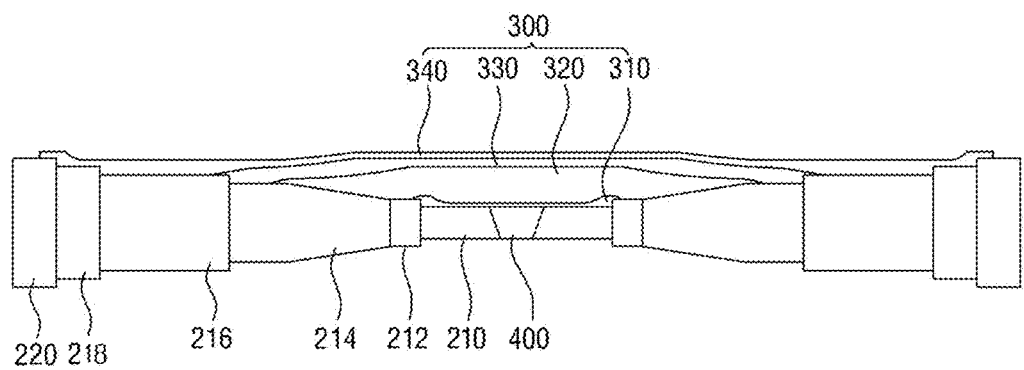
FIG. 2 is a schematic view of an intermediate connection system for an ultra-high-voltage DC power cable according to the present invention.

FIG. 2 is a schematic view of an intermediate connection system for an ultra-high-voltage DC power cable according to the present invention.

As illustrated in FIG. 2, an intermediate connection system for an ultra-high-voltage DC power cable according to the present invention may include a conductor connection part 400, in which ends of a pair of DC power cables at which conductors 210, inner semiconducting layers 212, insulating layers 214, outer semiconducting layers 216, and the like are sequentially exposed are provided to face each other and through which the conductors 210 exposed at the ends of the pair of DC power cables are electrically and mechanically connected to each other; and an intermediate connection part 300 surrounding the conductor connection part 400 and the ends of the pair of DC power cables at which the conductors 210, the inner semiconducting layers 212, the insulating layers 214, and the outer semiconducting layers 216 of the cables are sequentially exposed.

Here, the connector connection part 400 may be formed by inserting the pair of conductors 210 into a sleeve, and thereafter compressing an outer circumferential surface of the sleeve, fixing the pair of conductors 210 inserted into the sleeve by a bolt passing through the sleeve, or welding ends of the pair of conductors 210 together. Preferably, a copper crimp sleeve may be used to make an outer diameter of the sleeve substantially the same as those of the conductors 210 after compressing and machining or machining may be performed on the connector connection part 400 and the conductors 210 to make the outer diameters thereof substantially the same after welding, thereby minimizing a thickness of the intermediate connection part 300 to make the intermediate connection part 300 compact.

The intermediate connection part 300 may include an intermediate-connection-part inner semiconducting layer 310, an intermediate-connection-part insulating layer 320, an intermediate-connection-part outer semiconducting layer 330, and an intermediate-connection-part protective sheath layer 340.

The intermediate-connection-part inner semiconducting layer 310, the intermediate-connection-part insulating layer 320, the intermediate-connection-part outer semiconducting layer 330, and the intermediate-connection-part protective sheath layer 340 are configured to restore functions of the inner semiconducting layer 212, the outer semiconducting layer 214, and the inner sheath 212 of the cable which are sequentially peeled off in the cable connection part 400, and may be respectively formed of the same materials as the inner semiconducting layer 212, the outer semiconducting layer 214, and the inner sheath 212 of the cable. For example, the intermediate-connection-part inner semiconducting layer 310 may be formed by cross-winding and crosslinking a non-crosslinked tape formed of the same material as the inner semiconducting layer 21 of the cable. The intermediate-connection-part protective sheath layer 340 may be formed using a thermal contraction tube formed of the same material as the inner semiconducting layer 212 of the cable.

The intermediate-connection-part inner semiconducting layer 310 may surround the connector connection part 400 and an exposed portion of the conductor 210 and partially cover the inner semiconducting layer 212 of the cable exposed by peeling off the insulating layer 214 of the cable. The intermediate-connection-part outer semiconducting layer 330 may partially surround the intermediate-connection-part insulating layer 320, and the outer semiconducting layer 216 of the cable exposed by peeling off the metal sheath layer 218 covering the exposed insulating layer 214 of the cable, the inner sheath 220, and so on. The intermediate-connection-part protective sheath layer 340 may surround the intermediate-connection-part outer semiconducting layer 330 and partially surround at least the metal sheath layer 218 and the inner sheath 220 of the cable and so on.

The intermediate-connection-part insulation layer 320 may surround the intermediate-connection-part inner semiconducting layer 310, the inner semiconducting layer 212 of the exposed cable, and the insulating layer 214 of the cable exposed by peeling off the outer semiconducting layer 216 of the cable, may be formed of the same material as the insulating layer 214 of the cable, and preferably formed by cross-winding and crosslinking a non-crosslinked insulation tape formed of the same material as the insulating layer 214 of the cable.

The intermediate-connection-part insulating layer 320 may include inclined surfaces on at both ends thereof in a lengthwise direction of the cable. When the insulating layers 214 of the cables are peeled off to expose the inner semiconducting layers 212 of the cables, ends of the insulating layers 214 may be penciled in the lengthwise direction of the cables as shown in FIG. 2 and the intermediate-connection-part insulating layer 320 may include inclined surfaces corresponding to the shape of the penciled ends of the insulating layers 214 at both ends thereof to increase the length of an interface between the insulating layers 214 and the intermediate-connection-part insulating layer 320, thereby improving insulation performance.

The present inventors have completed the present invention through experimental confirmation that specific crosslinking by-products causing generation of space charges among crosslinking by-products inevitably generated during crosslinking of the intermediate-connection-part insulating layer 320 were α-cumyl alcohol (α-CA), acetophenone (AP), and α-methyl styrene (α-MS), the amounts of the specific crosslinking by-products were limited (particularly, according to a position on the intermediate-connection-part insulating layer 320 in a thickness direction of the intermediate-connection-part insulating layer 320) by limiting the amount of the crosslinking agent contained in the insulating composition of the intermediate-connection-part insulating layer 320 to be less than 1 wt % and performing degasing after the crosslinking of the intermediate-connection-part insulating layer 320, and generation of space charges and electric field distortion were significantly reduced due to the limitation of the amounts of the specific crosslinking by-products, thereby simultaneously preventing or minimizing a decrease of DC dielectric strength and impulse breakdown strength of the intermediate-connection-part insulating layer 320.

Furthermore, the present inventors have completed the present invention through experimental confirmation that problems that a degree of crosslinking of the intermediate-connection-part insulating layer 320 may decrease when the amount of the crosslinking agent is limited to be less than 1 wt % and thus mechanical and thus thermal properties of the intermediate connection part insulating layer 320 may decrease can be solved by increasing vinyl group content of a base resin contained in the insulating composition of the intermediate-connection-part insulating layer 320 to achieve a degree of crosslinking of 60% or more, e.g., 60 to 70%.

Specifically, when the intermediate-connection-part insulating layer 320 was divided in a thickness direction into three equal parts, e.g., an inner layer which is a lower layer directly on the intermediate-connection-part inner semiconducting layer 310, an intermediate layer on the inner layer, and an outer layer on the intermediate layer, generation of space charges in the intermediate-connection-part insulating layer 320 was suppressed to suppress electric field distortion in the intermediate-connection-part insulating layer 320 by adjusting the amount of each of the three types of specific crosslinking by-products contained in these layers to be 4000 ppm or less and an average amount of each of the three types of specific crosslinking by-products contained in each of the inner layer, the intermediate layer and the outer layer to be 3000 ppm or less, thereby preventing or minimizing both a decrease of DC dielectric strength in the cable connection part and a decrease of pulse breakdown strength.

Here, the dividing of the intermediate-connection-part insulating layer 320 into three equal parts should be understood to mean dividing a portion of the intermediate-connection-part insulating layer 320 having a certain length into three equal parts in the thickness direction.

EXAMPLES

1. Preparation Examples of Insulating Sample of Cable

Cable insulating samples each having a thickness of about 120 μm were prepared, in which the amount of each of crosslinking by-products of each layer was adjusted after crosslinking by adjusting the amount of a crosslinking agent and a degasing time, as shown in Table 1 below.

TABLE 1

| | | Crosslinking by-product content (ppm) | | | |
|---|---|---|---|---|---|
| | | α-CA | AP | α-ms | total |
| comparative example 1 | inner layer | 3112 | 1163 | 149 | 4424 |
| | intermediate layer | 3037 | 1406 | 568 | 5011 |
| | outer layer | 1919 | 1011 | 569 | 3499 |
| | average | 2689.3 | 1193.3 | 428.7 | 4311.3 |
| comparative example 2 | inner layer | 2947 | 1159 | 181 | 4287 |
| | intermediate layer | 2885 | 1443 | 641 | 4969 |
| | outer layer | 1667 | 853 | 475 | 2995 |
| | average | 2499.7 | 1151.7 | 432.3 | 4083.7 |
| comparative example 3 | inner layer | 2658 | 1073 | 261 | 3992 |
| | intermediate layer | 2595 | 1378 | 722 | 4695 |
| | outer layer | 1730 | 835 | 476 | 3041 |
| | average | 2327.7 | 1095.3 | 486.3 | 3909.3 |
| example 1 | inner layer | 2681 | 1052 | 257 | 3990 |
| | intermediate layer | 2509 | 1278 | 737 | 4524 |
| | outer layer | 1799 | 859 | 498 | 3156 |
| | average | 2329.7 | 1063.0 | 497.3 | 3890.0 |
| example 2 | inner layer | 2412 | 896 | 274 | 3582 |
| | intermediate layer | 2359 | 1046 | 553 | 3958 |
| | outer layer | 1463 | 540 | 373 | 2376 |
| | average | 2078.0 | 827.3 | 400.0 | 3305.3 |
| example 3 | inner layer | 2254 | 854 | 259 | 3367 |
| | intermediate layer | 2501 | 1065 | 507 | 4073 |
| | outer layer | 1593 | 610 | 394 | 2597 |
| | average | 2116.0 | 843.0 | 386.7 | 3345.7 |

2. Preparation Examples of Insulating-Layer Sample of Intermediate Connection Part Insulating-layer samples of the intermediate connection part each having a thickness of about 120 μm were prepared, in which the amount of each of crosslinking by-products of each layer was adjusted after crosslinking by adjusting the amount of a crosslinking agent and a degasing time, as shown in Table 2 below.

TABLE 2

| | | Crosslinking by-product Content (ppm) | | | | |
|---|---|---|---|---|---|---|
| | | α-CA | AP | α-ms | total | average |
| comparative example 4 | inner layer | 8480 | 2403 | 445 | 11328 | 9904.67 |
| | intermediate layer | 7831 | 2394 | 877 | 11102 | |
| | outer layer | 4326 | 1633 | 1325 | 7284 | |
| comparative example 5 | inner layer | 4522 | 1896 | 1840 | 8258 | 4993 |
| | intermediate layer | 650 | 1329 | 3005 | 4984 | |
| | outer layer | 34 | 360 | 1343 | 1737 | |
| comparative example 6 | inner layer | 2502 | 893 | 323 | 3718 | 4214.67 |
| | intermediate layer | 2808 | 1553 | 1364 | 5725 | |
| | outer layer | 847 | 1097 | 1257 | 3201 | |
| comparative example 7 | inner layer | 2995 | 799 | 1084 | 4878 | 4030.67 |
| | intermediate layer | 3383 | 783 | 479 | | |
| | outer layer | 1084 | 831 | 654 | 2569 | |
| example 4 | inner layer | 2389 | 918 | 689 | 3996 | 2998.67 |
| | intermediate layer | 2769 | 659 | 571 | 3999 | |
| | outer layer | 168 | 428 | 405 | 1001 | |
| example 5 | inner layer | 2091 | 703 | 382 | 3176 | 2638.67 |
| | intermediate layer | 1929 | 759 | 554 | 3242 | |
| | outer layer | 647 | 487 | 364 | 1498 | |
| example 6 | inner layer | 1567 | 752 | 676 | 2995 | 1797 |
| | intermediate layer | 437 | 382 | 493 | 1312 | |
| | outer layer | 156 | 353 | 575 | 1084 | |

3. Evaluation of Physical Properties

1) Measurement of field enhancement factors (FEF) of cable insulating samples

An FEF of Equation 1 as measured by connecting electrodes to opposite sides of each of insulating samples of comparative examples 1 to 3 and examples 1 to 3 and applying DC electric field of 50 kV/mm thereto for one hour. A result of the measurement is as shown in Table 3 below and FIG. 3.

TABLE 3

| | FEF (%) |
|---|---|
| comparative example 1 | 159 |
| comparative example 2 | 157 |
| comparative example 3 | 165 |
| example 1 | 137 |
| example 2 | 135 |
| example 3 | 132 |

Figure 3:
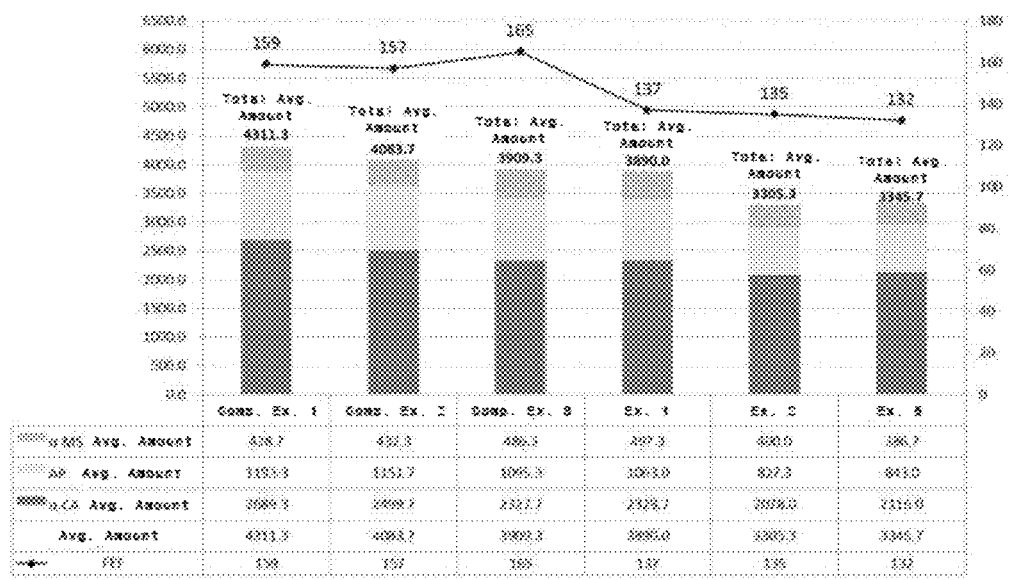
FIG. 3 is a graph showing a result of measuring field enhancement factors (FEFs) of samples of an insulating layer of an ultra-high-voltage DC power cable in an intermediate connection system for an ultra-high-voltage DC power cable, according to examples of the present invention.

As shown in Table 3 above and FIG. 3, in each of the insulating samples of comparative examples 1 to 3 in which the amounts of three types of specific crosslinking by-products were not controlled, the FEF indicating a degree of electric field distortion due to generation of space charges was high, i.e., about 160%. Thus, it is expected that dielectric strength can be decreased greatly.

In contrast, in each of the insulating samples of examples 1 to 3 of the present invention, the amounts of three types of specific crosslinking by-products were accurately controlled to suppress generation of space charges and thus the FEF indicating a degree of electric field distortion was controlled to be low, i.e., 140% or less. Therefore, it is expected that a decrease of electric strength can be minimized.

2) Measurement of breakdown voltage (BDV) of insulating-layer samples of intermediate connection part A voltage applied when dielectric breakdown occurred was measured by connecting electrodes to opposite sides of each of the insulating-layer samples of comparative examples 4 to 7 and examples 4 to 6, applying a voltage thereto and increasing the applied voltage at a rate of 1 kV/s. A result of the measurement is as shown in Table 4 below.

TABLE 4

|  | BDV (kV/mm) |
| --- | --- |
| comparative example 4 | 412.5 |
| comparative example 5 | 420.8 |
| comparative example 6 | 419.1 |
| comparative example 7 | 420.5 |
| example 4 | 515.7 |
| example 5 | 531.3 |
| example 6 | 520.9 |

As shown in Table 4, electric field distortion occurred due to generation of space charges and thus dielectric strength decreased greatly in the case of the insulation-layer samples of comparative examples 4 to 7 in which the amounts of the three types of specific crosslinking by-products of each layer and an average thereof exceeded specific levels.

In contrast, in the insulation-layer samples of examples 4 to 7, the amounts of the three types of specific crosslinking by-products of each layer and an average thereof were adjusted to be equal to or less than the specific levels and thus electric field distortion due to generation of space charges was minimized, thereby maintaining dielectric strength to be greater than or equal to 510 kV/mm.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

The invention claimed is:

1. An intermediate connection system for an ultra-high-voltage direct current (DC) power cable, comprising:
   a pair of DC power cables each including a conductor formed by twisting a plurality of strands, a cable inner semiconducting layer surrounding the conductor, a cable insulating layer, and a cable outer semiconducting layer, the pair of DC power cables provided such that ends thereof at which the conductors, the cable inner semiconducting layers, the cable insulating layers, and the cable outer semiconducting layers are sequentially exposed face each other;
   a conductor connection part configured to electrically and mechanically connect the conductors exposed at the ends of the pair of DC power cables; and
   an intermediate connection part surrounding the connector connection part and the ends of the pair of DC power cables at which the conductors, the cable inner semiconducting layers, the cable insulating layers, and the cable outer semiconducting layers are sequentially exposed;
   wherein the intermediate connection part comprises:
   an intermediate-connection-part inner semiconducting layer surrounding the connector connection part;
   an intermediate-connection-part insulating layer surrounding the intermediate-connection-part inner semiconducting layer;
   an intermediate-connection-part outer semiconducting layer surrounding the intermediate-connection-part insulating layer; and
   an intermediate-connection-part protective sheath layer surrounding the intermediate-connection-part outer semiconducting layer,
   the intermediate-connection-part insulating layer is formed of an insulating composition containing a polyolefin resin and a crosslinking agent, and
   the intermediate-connection-part insulating layer is divided in a thickness direction thereof into three equal parts to obtain an inner layer, an intermediate layer and an outer layer,
   wherein a total amount of α-cumyl alcohol (α-CA), acetophenone (AP) and α-methyl styrene (α-MS) among crosslinking by-products contained in each of the inner layer, the intermediate layer, and the outer layer is 4,000 ppm or less.

2. The intermediate connection system of claim 1, wherein an average amount of the crosslinking by-products contained in each of the inner layer, the intermediate layer, and the outer layer is 3000 ppm or less.

3. The intermediate connection system of claim 1, wherein a breakdown voltage of the intermediate-connection-part insulating layer is 510 kV/mm or more.

4. The intermediate connection system of claim 1, wherein the polyolefin resin comprises a polyethylene resin.

5. The intermediate connection system of claim 1, wherein the crosslinking agent comprises a peroxide crosslinking agent.

6. The intermediate connection system of claim 5, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

7. The intermediate connection system of claim 1, wherein the insulating composition further comprises at least one additive selected from the group consisting of an antioxidant, an extrudability enhancer and a crosslinking aid.

8. The intermediate connection system of claim 1, wherein the intermediate-connection-part insulating layer is formed by cross-winding and crosslinking a non-crosslinked insulating tape containing the insulating composition.

9. The intermediate connection system of claim 1, wherein the conductor connection part is formed by welding ends of conductors of the pair of DC power cables together.

10. The intermediate connection system of claim 1, wherein a semiconductive composition of the intermediate-connection-part inner semiconducting layer or the intermediate-connection-part outer semiconducting layer comprises a crosslinking agent in an amount of 0.1 to 5 parts by weight, based on 100 parts by weight of a base resin of the semiconductive composition.

11. The intermediate connection system of claim 10, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), and ethylene butyl methacrylate (EBMA).

12. The intermediate connection system of claim 1, wherein the cable insulating layer is formed of an insulating composition containing a polyolefin resin and a crosslinking agent, and when the cable insulating layer is divided in a thickness direction into three equal parts to obtain an inner layer, an intermediate layer and an outer layer, an average of amounts of α-cumyl alcohol (α-CA), acetophenone (AP) and α-methyl styrene (α-MS) which are three types of specific crosslinking by-products among the crosslinking by-products contained in each of the inner layer, the intermediate layer, and the outer layer is 3,890 ppm or less.

13. The intermediate connection system of claim 12, wherein a total amount of the three types of specific crosslinking by-products contained in the inner layer of the cable insulating layer is 3,990 ppm or less.

14. The intermediate connection system of claim 13, wherein a field enhancement factor (FEF) defined by the following Equation (1) is 140% or less:

FEF=(maximally increased electric field in insulating sample/electric field applied to insulating sample)*100, [Equation 1]

wherein the insulating sample is prepared by crosslinking the insulating composition of the cable insulating layer, the insulating sample having a thickness of 120 pm, the electric field applied to the insulating sample is a DC electric field of 50 kV/mm applied to electrodes connected to opposite sides of the insulating sample, and the maximally increased electric field in the insulating sample is a maximum value among increase values of the electric field during the application of the DC electric field of 50 kV/mm to the insulating sample for one hour.

15. The intermediate connection system of claim 12, wherein the polyolefin resin comprises a polyethylene resin.

16. The intermediate connection system of claim 12, wherein the crosslinking agent comprises a peroxide crosslinking agent.

17. The intermediate connection system of claim 16, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

18. The intermediate connection system of claim 12, wherein the insulating composition further comprises at least one additive selected from the group consisting of an antioxidant, an extrudability enhancer and a crosslinking aid.

19. The intermediate connection system of claim 1, wherein a semiconductive composition of the inner and outer semiconducting layers of the power cable comprises a crosslinking agent in an amount of 0.1 to 5 parts by weight, based on 100 parts by weight of a base resin of the semiconductive composition.

20. The intermediate connection system of claim 19, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), and ethylene butyl methacrylate (EBMA).

* * * * *